May 26, 1942.  H. J. KENNEDY  2,284,096
ROASTING APPARATUS
Filed Jan. 5, 1938    6 Sheets-Sheet 1

INVENTOR
HAROLD J. KENNEDY
BY
ATTORNEY

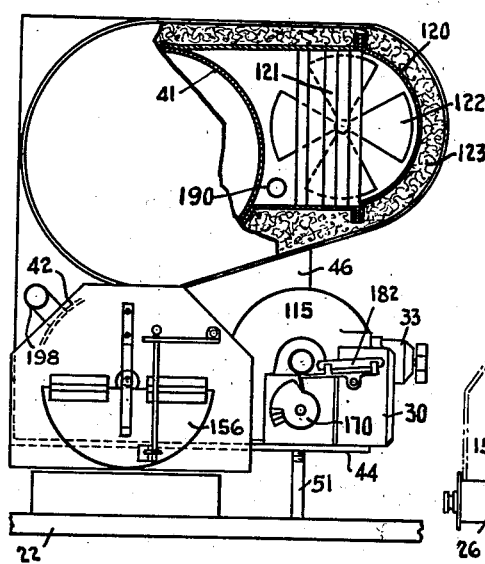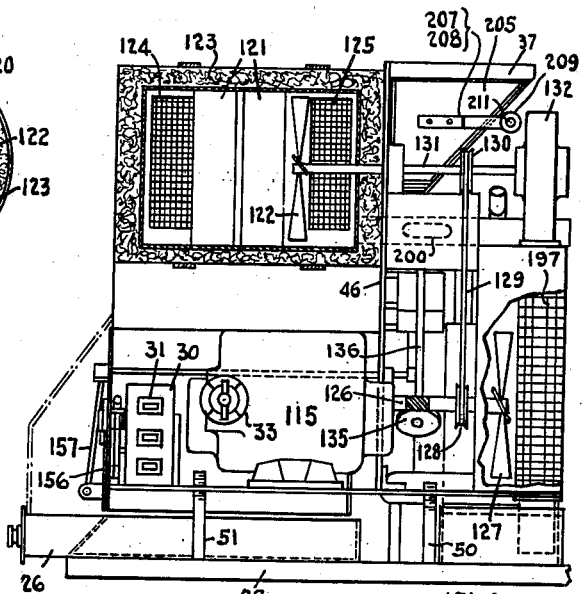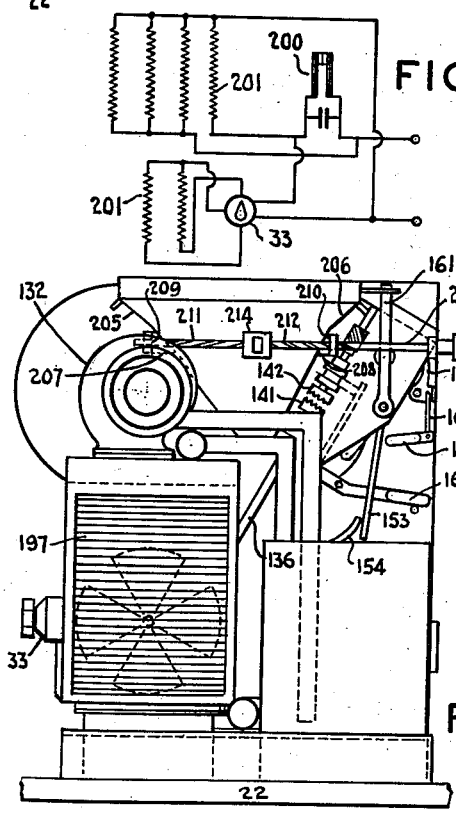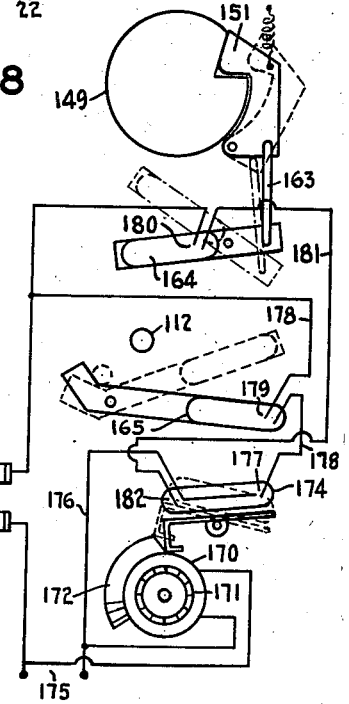

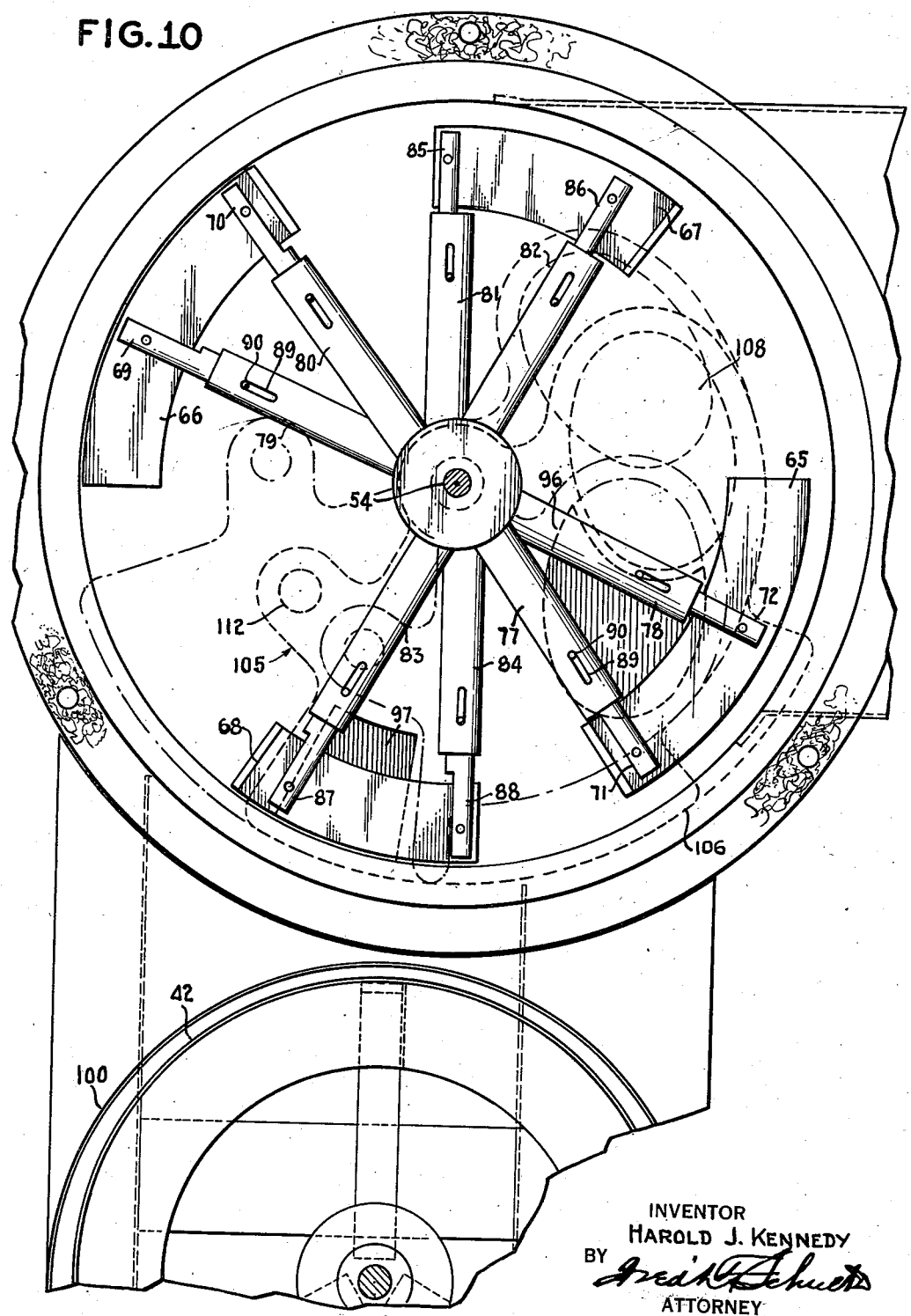

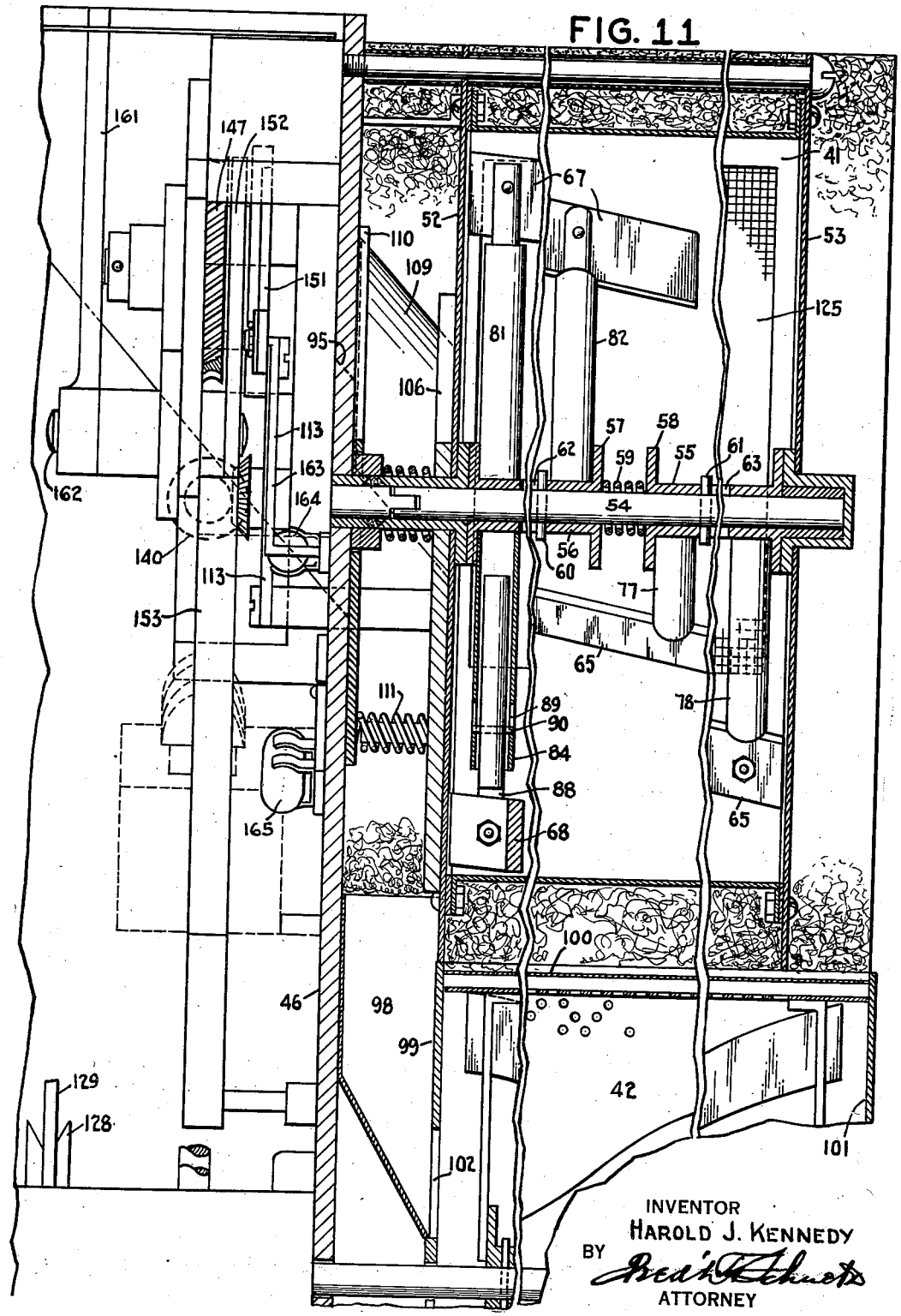

May 26, 1942.　　　　H. J. KENNEDY　　　　2,284,096
ROASTING APPARATUS
Filed Jan. 5, 1938　　　　6 Sheets-Sheet 5

INVENTOR
HAROLD J. KENNEDY
BY
ATTORNEY

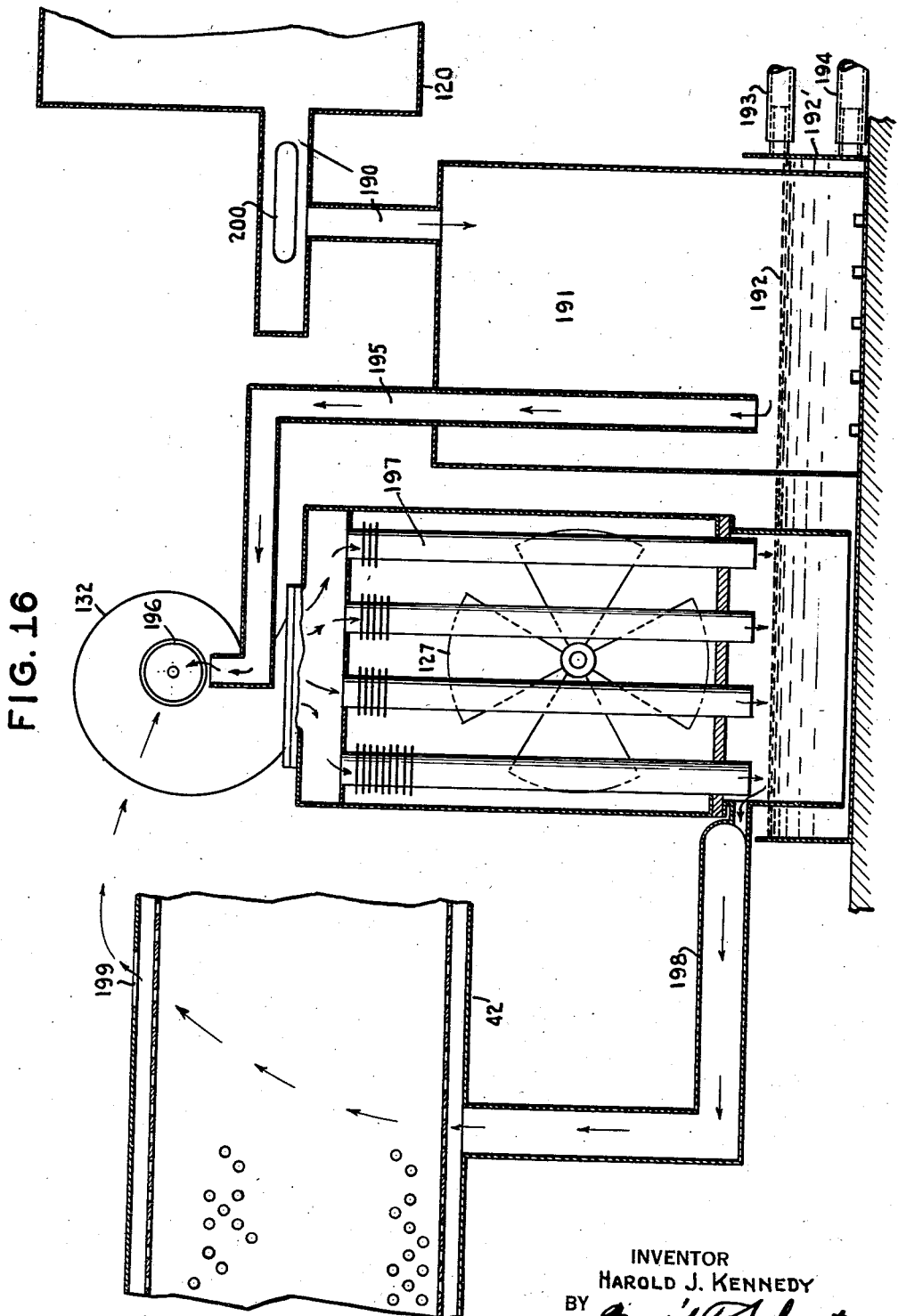

Patented May 26, 1942

2,284,096

UNITED STATES PATENT OFFICE 2,284,096

ROASTING APPARATUS

Harold J. Kennedy, Larchmont, N. Y.

Application January 5, 1938, Serial No. 183,415

16 Claims. (Cl. 34—56)

The invention relates to roasting apparatus, more especially adapted to the roasting of green coffee and various other kernels such as nuts, popcorn and the like.

The invention has for an object the provision of a roasting apparatus of this nature which shall be particularly compact and portable; also, a roasting apparatus which may be constructed at relatively low cost.

Another object of the invention resides in the provision of roasting apparatus having a minimum of parts, and embodying a stationary roasting cylinder with rotatable stirrer means located therein.

A further object of the invention is to render the various operations involved substantially automatic, the actual period of roasting being under control of a suitable timing device which initiates at the desired roast the discharge of the material into a cooling cylinder and finally into a storage drawer or bin from which it may be withdrawn as required, while in the meantime a charge has been supplied to a measuring hopper associated with the roasting cylinder.

A still further object of the invention is to restore within the roasting cylinder after delivery of a charge therefrom the maximum temperature of the heating gases.

Another object of the invention is to so construct a roasting apparatus that the discharged product may be received directly by a storage drawer positioned conveniently below a counter or the like and upon which the said apparatus may be located for operation without cutting or damaging the counter in any manner.

The invention has for a further object the provision of suitable ventilating means for the interior of the apparatus, together with means for cleaning and cooling the spent gases.

The invention has for its object, also, certain features of construction which will hereinafter be more fully set forth, and whereby a simple and effectively operating mechanism is secured.

In carrying out the invention, a frame for supporting the mechanism is surrounded by a suitable housing or cover member which is provided at the top with a supply or storage bin with opening and adapted to deliver into a measuring hopper, located at the top of the frame, the material to be roasted. There is provided at the lower portion of the cover an outlet guide or chute designed to empty into a storage bin or drawer which may be mounted beneath a counter or the like supporting the entire roasting apparatus, and said drawer is adapted to receive and store the roasted and cooled and cleansed material from the roasting and cooling apparatus. This apparatus includes a roasting cylinder fixedly supported on the frame and a cooling cylinder rotatably mounted thereon.

The control of the movements of the material into and from the roasting cylinder is effected by means of an oscillatable valve element, in turn subject to a suitable timing element; and the degree of roast to which a charge of the material is subjected while in the said roasting cylinder is also controlled by said timing element through determining the length of time the charge is subjected to heated gases passed therethrough. Provision is made to cleanse the vapors resulting from the roasting operation and also to afford a stream of cooling air over the material during its cooling period in the cooling cylinder, prior to discharge therefrom.

The nature of the invention, however, will best be understood when described in connection with the accompanying drawings, in which:

Fig. 5 is a front elevation of the mechanism with cover removed and portion of heater cover broken away and with part of the roasting cylinder shown in section.

Fig. 6 is a side elevation of the mechanism, with cover removed and portions broken away.

Fig. 7 is a rear elevation of the mechanism with cover removed.

Fig. 8 illustrates the electrical control and timing device; and Fig. 9 is a wiring diagram of the heater control.

Fig. 10 is an enlarged fragmentary end view of the roasting cylinder and the cooling cylinder with head removed, together with valve mechanism and stirrer mechanism associated with the former cylinder.

Fig. 11 is an enlarged fragmentary longitudinal section through the roasting and cooling cylinders, and shows also the charging and the discharging mechanism associated with the former.

Fig. 16 is a detail, fragmentary, longitudinal section of the cooling and cleansing portion of the apparatus for the gases thereof.

Figure 1:
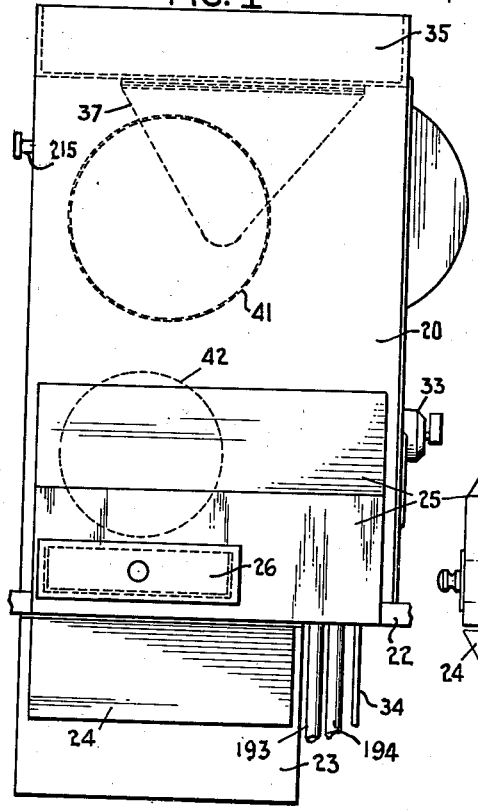
Fig. 1 is a front elevation of the roaster apparatus, and Fig. 2 a side elevation thereof, as mounted upon a counter or like support.
Figure 2:
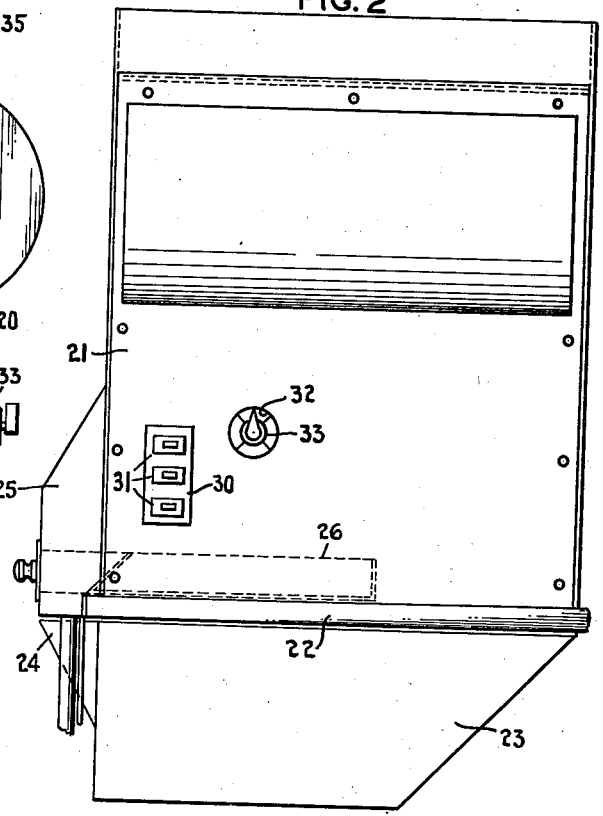
Figure 3:
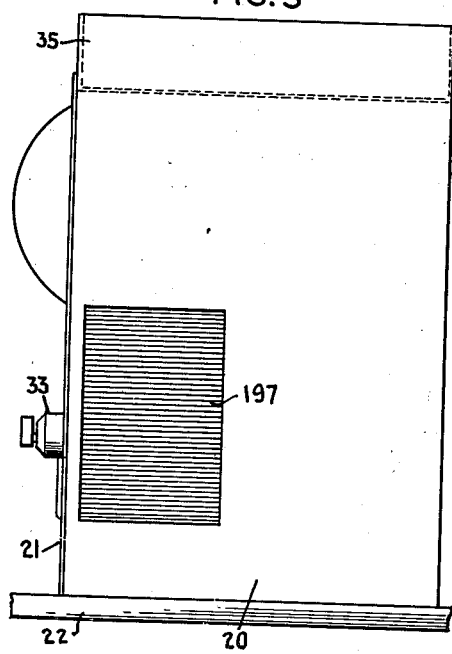
Fig. 3 is a rear elevation of the apparatus.
Figure 4:
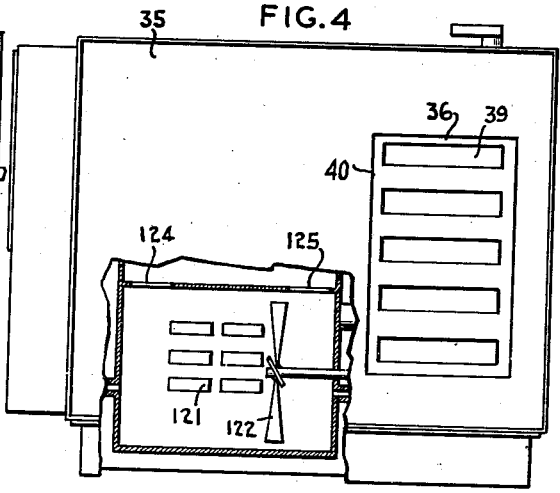
Fig. 4 is a plan thereof with a portion of the storage bin broken away and the heating chamber shown in section.

Referring to the drawings, 20 designates a three-sided housing member or hood for the mechanism, which hood is adapted to be closed by means of a side plate 21 to be removably attached to the housing 20 and affording a cover adapted to fit over the entire mechanism and with it to rest upon a suitable support such, for example, as a counter 22 or the like from which the roasted material is to be dispensed. There is associated with said counter immediately below the same a suitable drawer or bin 23 for storing the roasted material as it is delivered from the roasting apparatus, for example, into a forwardly inclined mouthpiece 24 at the outer end of drawer 23. There is provided over the front or dispenser side of the housing to this end an apron or chute 25 to direct the discharged material into the receiver mouthpiece 24. A drawer 26 passes through this apron and is designed to receive chaff and other waste material from the roasted product during its cooling in a cooling cylinder, hereinafter set forth and located immediately above said drawer, which drawer is designed to rest also on the said counter.

Plate 21 has an opening 30 to expose a plurality of switches 31, and an opening 32 to expose a selector switch 33, the former for introducing the operating current, as supplied through a conduit 34, and the latter being adapted for controlling the degree of heat applied by the heaters during the roast—all of which will be hereinafter more fully described.

The top of housing 20 is provided with a depressed or pan portion 35 for storing a supply of the raw material, and along the back is provided an opening 36 in the bottom of the pan through which the raw material may be discharged at the proper time into a measuring hopper 37 located immediately below said opening. The top of the hopper is normally closed by means of a slotted slide having the openings 38, Fig. 12, designed to register with corresponding openings 39 provided in a top plate 40 of the hopper.

This slide normally seals the hopper from the material in the pan 35; and when the slide is moved, as will hereinafter be more fully set forth, to register the slots 38 and 39, the raw material will feed into the hopper 37 until the desired charge has been secured, as determined by its dimensions, whereupon the slide will be reciprocated back to its sealing-off position. Subsequently, this measured charge in the hopper is delivered therefrom into the roasting cylinder 41; and when a roast has been completed, it descends to the cooling cylinder 42 where it is suitably cooled and the chaff removed therefrom into the chaff drawer 26, the charge being finally discharged through the apron or chute 25 into the mouthpiece 24 of drawer 23 where it is retained for disposal in the usual manner.

Figure 12:
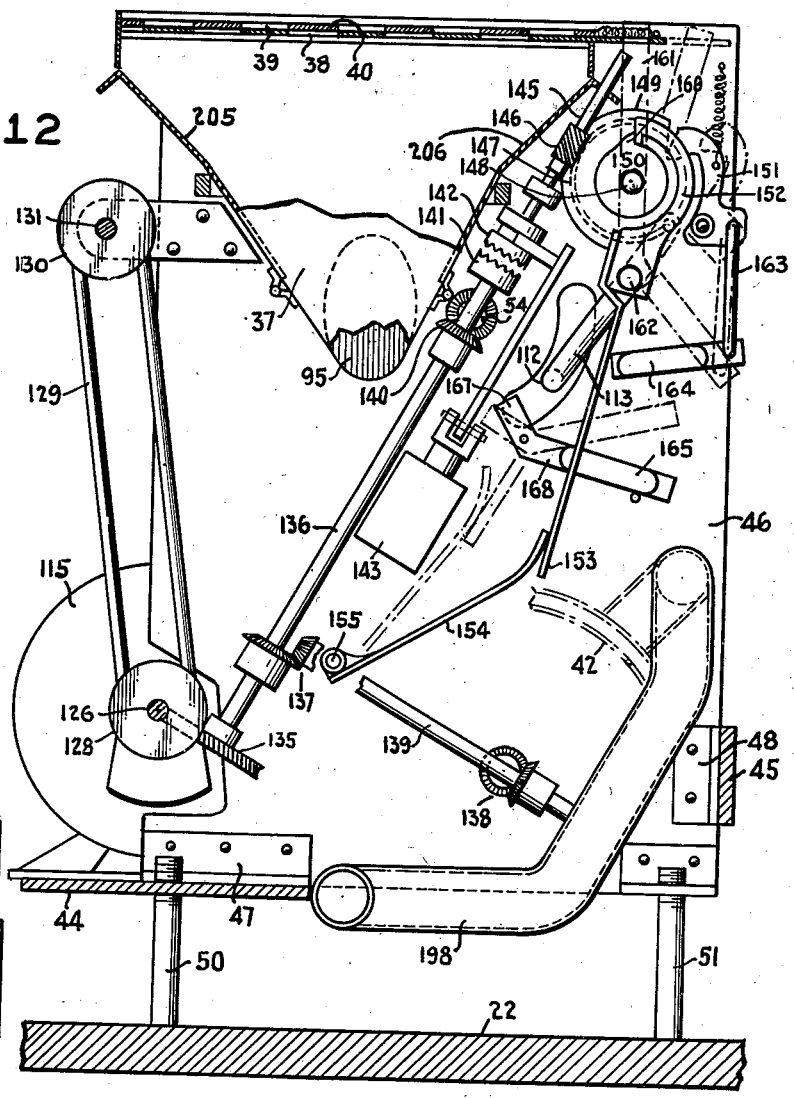
Fig. 12 is a detail, fragmentary elevation of the timed control mechanism and drive mechanism.

To secure these discharges from the respective cylinders and to retain the charge in the roasting cylinder for the time necessary to obtain the desired roast thereof, the following mechanism is provided, said mechanism being designed to be supported on three plates 44, 45, and 46, Fig. 12, respectively. The first-named plate is horizontally disposed and the two other plates vertically and at right angles to each other; and are secured together by means of the various angle pieces 47 and 48. Plate 44 is carried, furthermore, by two supporting legs 50 and the plate 46 by a leg 51, said legs displacing the frame from the counter 22 to afford space for accommodating the chaff drawer 26 and other parts of the apparatus.

On the one side of the upright plate 46 is mounted the roasting cylinder 41 and the cooling cylinder 42, together with an operating motor, while upon the opposite side is attached the drive mechanism and the control mechanism for regulating the introduction of material into the roasting cylinder, its discharge therefrom into the cooling cylinder, and the eventual discharge from the latter. The measuring hopper 37 for the material is also located on said opposite side of the plate 46 as well as the cooling and vapor cleansing apparatus.

The roasting cylinder 41 is closed at its opposite ends by heads or end plates 52 and 53, Fig. 11, respectively, mounted over a shaft 54 constituting the longitudinal axis of the roasting cylinder. With this shaft is designed to be rotated a plurality of stirrer elements spaced axially along the said shaft and slidable axially therealong. The stirrers to this end are carried by hubs 55 and 56 having juxtaposed flanges 57 and 58, respectively, between which and over the shaft is mounted a spring 59 tending to maintain said hubs apart. The latter are secured to the shaft 54 and for axial displacement thereon as by means of respective pins 60 and 61 passing through the shaft and through corresponding pairs of slots 62 and 63 in the hubs. This will enable the stirrers to accommodate themselves to temporary obstructions in the mass of material within the cylinder. The stirrers which are constituted as a pair of long blades 65 and 66, and a pair of short blades 67, 68, Fig. 10, are further so mounted as to have radial play to also accommodate themselves to temporary obstructions in this direction; and, moreover, may oscillate slightly.

To this end, the respective pairs of blades or scrapers 65, 66, and 67, 68 are mounted in the case of the longer blades at the outer flattened ends 69—70 and 71—72, respectively, of rods radially movable in tubular elements 77, 78 and 79, 80, extending radially outwardly from the axis of shaft 54 and carried by the hub 55 in parallel planes. Similarly, for the pair of shorter blades 67, 68, tubes 81, 82 and 83, 84 support the rods with flattened ends 85—86 and 87—88. To permit of this radial displacement of a blade, the corresponding tube, for example, the tube 77, is provided with a slot 89 into which projects a pin 90 extending outwardly from the corresponding rod of flattened end 71. The mounting of a blade on the rods, moreover, is such as to allow of lost motion so that a blade may rock freely on its supporting rod which in turn may reciprocate radially in the corresponding tube.

The particular arrangement of these stirrers thus accommodates the same to any irregularities in the inner surface of the roasting cylinder against which the stirrers may operate, and any wedging action also is obviated through the freedom permitted a stirrer.

Rotation is imparted to the said shaft 54 as will be hereinafter set forth; and there is mounted about said shaft a disk valve device for oscillation thereon in controlling an opening 95 in the upright plate 46 and through which the material to be roasted is introduced from the measuring hopper into the cylinder, having a similar opening 96, Fig. 10, in its corresponding end plate but at a lower level so that the material will flow therein by gravity. The valve device controls also an outlet opening 97 provided in the head of the roasting cylinder for discharge of the roasted material therefrom into the cooling cylinder 42 which is located immediately below the same and rotatably mounted at the lower portion of wall 46.

The discharge from the roasting cylinder through opening 97 is into a chute 98, the outer wall of which is attached to plate 46, and its inner wall being constituted by the one head 99 of a casing or cover 100 for the cooling cylinder, said cover at the opposite end being closed by a further head 101. There is provided in the head 99 an opening 102 communicating with the bottom of the chute 98 through which the roasted material enters the cooling cylinder.

The said disk valve device comprises a plate 105 having the sector portion 106 designed to operate over the opening 97 and a duct portion 107 having an outlet 108 to cooperate with the inlet 96 of the roasting cylinder and an inlet 109. The inlet end of the duct fits an opening in a segment 110 and said inlet 109 is designed to cooperate with the opening 95 in the plate 46. Segment 110 is held away from the disk member 105 as by means of springs 111, and a post 112 attached to plate 105 passes through segment 110 for receiving a link to oscillate the disk valve member, as will hereinafter be set forth. Both the segment 110 and the disk 105 are pivotally mounted on the shaft 54.

Provision is made to oscillate the valve member about the shaft 54 to position it in accordance with the various operations. Thus, as indicated in the dash-line position, Fig. 10, it is in the position corresponding to the charge-roasting phase, the sector portion 106 covering the discharge opening 97 and disk 105 the charging opening 96. To discharge the roasted material, disk 105 assumes the position indicated by the dotted lines, Fig. 10, wherein sector 106 uncovers opening 97. To charge the cylinder with material to be roasted, the disk returns to the position shown in the dash-dot lines, in which position the opening 96 in the cylinder and the opening 95 in the plate are brought into registry with the tube 109 to convey the raw material from the hopper to the cylinder.

Rotation of the stirrers in said roasting cylinder and of the cooling cylinder is effected from an electric motor 115 through intermediate mechanism and when the corresponding switch of the bank of switches 31 is closed, this rotation not being subject to the control mechanism.

A heater device is associated with the roasting cylinder 41 and comprises a casing 120 having a grid 121 of electric heating units behind which is located a fan 122 to blow over said heaters the air and vapors in said casing and in the cylinder 41 which communicates with the said casing through openings 124 and 125, the casing and cylinder having an enclosing insulating hood 123 sealing more or less the entire roasting portion and heating means. When the apparatus is in use, the heat is constantly on for the roasting cylinder, as in closing another of the switches 31 for the heating surface, Fig. 9; and the heat may be increased for various roasts through cutting in further units by means of the selector switch 33, as is well understood.

Also, the electric motor 115 is constantly operating when the apparatus is in use and is controlled by one of the switches 31. The said motor rotates continuously the drive shaft 126; and on this shaft is secured a suction fan 127 and a pulley 128. The latter, through a belt 129, drives a further pulley 130 on shaft 131 for the fan 122. On this shaft is mounted the impeller of a blower 132, the purpose of which and the fan 127 will hereinafter be set forth.

When the novel apparatus is in action, and as has hereinbefore been noted, the various fans, blowers, and heating coils will be continuously in operation, as well as the cooling cylinder which is constantly rotated from the drive shaft 126 through intermediate mechanism including the worm and worm wheel 135, a countershaft 136 and the pairs of bevelled gear wheels 137, 138, with connecting shaft 139. It will be observed, also, that the stirrers within the roasting cylinder are also being constantly rotated.

Figure 15:
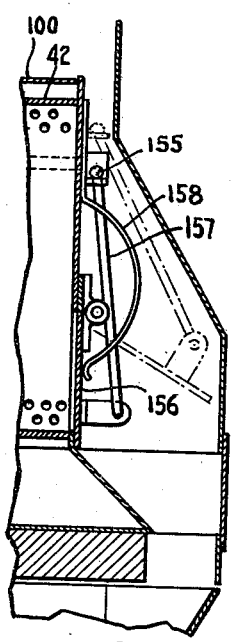
Fig. 15 is a fragmentary vertical section of the discharge mechanism for delivering a charge from the cooling cylinder.
Figures 13, 14:
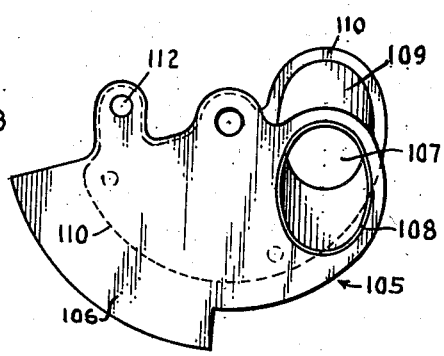
Figs. 13 and 14 are respectively a side elevation and a front elevation of a valve element.

Provision is made for the intermittent actuation of the feed mechanism to the measuring hopper, the discharge of a charge therefrom into the roasting cylinder, the discharge from the latter into the cooling cylinder and the final delivery from the latter to the storage bin or drawer 23, with a predetermined timing of the roast period as well as of a reheat period for the roasting cylinder. Reference being had more especially to Figs. 11 and 12 of the drawings, the said countershaft 136 is constantly rotating and, through the bevelled gears 140, rotates the shaft 54 and the stirrers mounted thereon. At its upper end, the said shaft 136 is provided with the clutch half 141, the other half 142 of the clutch being electromagnetically controlled, as will be hereinafter set forth, from a solenoid 143. When the clutch halves are in engagement, rotation is communicated to a further shaft 145 carrying worm 146 which, in turn, engages a worm wheel 147 adapted to rotate the shaft 148. On the latter shaft, to rotate therewith, is a notched disk 149 and a cam element 150. The former is designed to be engaged by a bell-crank detent 151 and the latter by one end 152 of a rocker arm having an opposite end 153 designed to engage the arm 154 on the rock shaft 155 controlling the opening and closing of the discharge door 156 of the cooling cylinder, which door is connected with the said rock shaft 155 through a link 157. A spring 158 normally holds the hinged door 156 closed, this corresponding to the position of the arm 154 shown in full lines, Fig. 12, the broken-line position being that for the open position of the door, as indicated in Fig. 15. From the shape of the cam shown, it will be noted that the nose 160 of said cam provides for a more or less abrupt opening and closing of the said door when the cam and disk are rotated.

At the same time and as a result of the action of said nose, the slide in the top of hopper 37 is reciprocated to admit a charge of the raw material into the measuring hopper. This is effected through the action of an arm 161 secured on the rock shaft 162 oscillated by the end 152 of the rocker arm.

As the disk member 149 continues to rotate, detent 151 also will be thrown out of the notch of the disk and the bell-crank rocked thereby to displace a link 163 connected therewith at one end and whose opposite end is connected to a mercury switch 164, pivoted to the plate 46, to rock the same to the position shown in broken lines and bridge thereby contacts of the said switch.

Rotation of the disk, furthermore, controls the operation of an additional mercury switch 165, also mounted on the plate 46. This is effected by means of the connecting rod 113 which is pivoted to the said disk at one end and whose other end is pivoted to the post 112 of the valve device controlling the supply of raw material to and its discharge from the roasting cylinder. As the said disk rotates, a reciprocatory motion will be imparted to the said pin for oscillating the valve device; and at the same time and when said pin 112 has reached the lowest point in its travel, the pin will engage one arm 167 of a lever pivoted to plate 46. The other arm 168 of the said lever carries the said switch 165 which, when rocked to the position shown in the broken lines, opens a circuit shown more particularly in Fig. 8.

Reference being had to this figure, there is indicated a cam 170 driven by a suitable timing device, such as the well-known synchronous type of electric clock, indicated at 171, operated from a suitable source of power under control of one of the switches 31. This cam has a lower-dwell portion for the greater proportion of its periphery and a higher portion 172, which may be adjustable to vary the proportion of the respective dwell portions of the cam, as is well understood. The said cam 170 is designed to rock a mercury switch 174 to two positions corresponding to the different dwell portions of the cam. At the lower-dwell portion, switch 174 assumes the position indicated in full lines in the drawings; and, when on the high portion 172 of the cam, the switch will assume the position shown in broken lines, the former position corresponding to the period that the charge is maintained within the roasting cylinder and subject to the roasting action of the heated gases passed thereover, as hereinbefore described.

To this end, switch 174 is included in circuit with the solenoid 143 and with a suitable source of current, indicated at 175. When the cam is in the position shown, no current will pass to solenoid 143; but when the raised portion 172 becomes effective, switch 174 will be tilted to the broken-line position. Current is then supplied to the solenoid 143 through a lead 176, the contacts 177 of switch 174, and a further lead 178. This lead, it will be noted, includes the contacts 179 of switch 165, which contacts, in the position shown, close the circuit through said switch so that solenoid 143 will be energized to throw in the clutch halves 141 and 142 and start rotation of disk 149. Before the cam 170 operates on the lower-dwell portion, switch 164 will have been tilted, through disengagement of the detent 151, to close a further circuit to the solenoid through contacts 180 of said switch, which contacts are included in a lead 181 to the said solenoid from contacts 182 at the end of switch 174 opposite the contacts 177 thereof.

The latter switch, when returned to the position shown in full lines, will, in closing the circuit to the said solenoid, also initiate a further rotation of disk 149 after switch 165 has been tilted to the position shown in broken lines, and which would otherwise cause the circuit to the solenoid to be interrupted. This interruption of the circuit to the said solenoid then does not occur until detent 151 again drops into the notch of a disk, which interrupts the circuit at contact 180 of said switch 164. By this arrangement, the charge will be retained in the roasting cylinder throughout the entire period as determined by the low-dwell portion of the cam, and the roasting cylinder will be empty and recovering temperature during the period the high-dwell portion of the cam is active. It will be understood that when the high-dwell portion of cam 170 moves mercury switch 174 to the position shown by the broken lines, the solenoid will be energized and the clutch halves engaged until pin 112 reaches the lowest position of its travel. At this time, contacts 179 of switch 165 are broken and the solenoid circuit is interrupted, which allows the clutch halves to disengage and stop all motion of the control mechanism until mercury switch 174 is returned to the position shown in solid lines, when the solenoid will again be energized and clutch halves engaged to continued control of the mechanism operation until the complete rotation of disk 149 has been completed.

The circuit-maintaining switch 164 does not prevent interruption of the solenoid circuit when contacts 179 are broken since these contacts are broken at a time when the current flows through contacts 177, that is to say, when the mercury tube 174 is in the position indicated by the dotted lines and the high-dwell portion of the cam is operative. Contacts 180 receive current from the contacts 182 of the tube 174 when the latter is resting on the low-dwell portion of the cam. Circuit 181 and switch 164 are provided for the purpose of maintaining the control cycle until one complete cycle (or revolution) of notched disk 149 is accomplished.

Following through a complete cycle of operations, the control elements will be assumed in the position indicated in Fig. 8, with the respective mercury switches, detent, and pin locations as shown in full lines. This corresponds to the conclusion of the roasting period, with disk valve member 105 located in its intermediate roasting position. During a predetermined arc of its lowdwell portion the cam 170 is effective for determining the roasting period of the charge, said cam rotating in a clockwise direction; and when the proper time interval for a roast has elapsed, the high-dwell portion 172 of cam 170 will become effective. Solenoid 143 is then energized through contacts 177 and 179 to cause the rotation of disk 149 and its cam 150, which move in a clockwise direction, throwing thereby also the circuit-maintaining switch 164 to the broken-line position. Through movement of pin 112 thereby to its lowermost position, valve disk member 105 will be moved to its lowermost position (shown in dotted lines, Fig. 10) for discharge of the roasted material. At this point, pin 112 also engages with the arm 167 of switch 165 to rock the latter to the position shown in broken lines, opening thereby the solenoid circuit at contact 179 for causing rotation of disk 149 to cease.

This rotation of the disk 149 is not resumed until the lower-dwell portion of cam 170 again becomes active. At this stage, switch 174 returns to its position (shown in full lines, Fig. 10) to close the circuit at the contacts 182 and again energize solenoid 143, this time through the contacts 180 of switch 164 which were closed when disk 149 first started its rotation. Thereupon, through rotation of disk 149, pin 112 is moved continuously to its uppermost position and back to its intermediate position. The disk valve member 105 moved thereby admits a fresh charge of material in passing through its uppermost location (shown by the dash-dot lines, Fig. 10), then returning to the intermediate or roasting position (shown by the dash lines, Fig. 10). As aforesaid, the roasting continues until the high-dwell portion of cam 170 again becomes effective.

The return movement of valve disk member 105 is arrested when pin 112 ceases its movement due to the dropping of detent 151 again into its notch, thereby breaking the maintaining contacts 180 so that the rotation of disk 149 also ceases. This restores the conditions for restarting the cycle when the high-dwell portion of cam 172 comes into action.

During the roasting operation, it will be understood, of course, that gases will be evolved from the material being roasted; and provision is made to remove these from the roasting cylinder 41, as through a venting tube 190 which delivers the same into a condensing chamber 191 and in the bottom of which is provided a layer of water 192 as in a pan 192'. The level of this water therein is determined by a pipe 193, there being provided also a drain pipe 194 to the condensing chamber for draining out dirty water and for filling the water pan. Condensing chamber 191 is connected through a pipe 195, which extends from slightly above the water line of the water in the bottom of said chamber to just below the intake 196 of the blower 132. This blower delivers the gases into a radiator 197, exposed to the atmosphere at the back of the apparatus, and discharges the same slightly above the water-line of the water at the bottom of said radiator. The fan 127 is arranged to blow air over the said radiator to cool the same. The discharge from the radiator is then led through a duct 198 connected with said radiator into the cooling cylinder 42, and from the same through an opening 199 in the cooling cylinder cover into the space between the mechanism and the surrounding case 20.

The air within the case 20 is also continuously recirculated by blower 132 through radiator 197, duct 198 and the cooling cylinder 42, thus keeping the inside air and gases of case 20 relatively cool. In continuously blowing this air and gases against the water in the bottom of the radiator 197, any solids in the gases will cling to the surface of the water. The gases leaving the cylinder during the first part of the roast consist of steam and the offensive odors and vapors developed from the green beans, and are condensed and dissolved in condensing chamber 191 to be run off in the form of a liquid through the drain 194. Those gases that are not recoverable by cooling and dissolving and which are evolved during the latter part of the roast, are allowed to leave the case at the joint where case 20 rests on the counter. Since there is only a small quantity of such gases and they have the pleasant aroma of roasted beans and have no moisture or stickiness, such small amount will in no way be objectionable but, rather, because of the pleasant odor, will serve to advertise the roasting operation to the customers.

Three adjustments to control the degree of roasting are possible. Thus, the cam 170 may be set to determine the number of minutes the material is roasting and the temperature of the recovery period; the amount of heat generated by the heaters may be adjusted by the selector switch 33; and the amount of green material introduced into the roasting cylinder may be adjusted by increasing or diminishing the volume of the measuring hopper 37. The first of these adjustments is made at the time of installation of the apparatus, and the second and third adjustments are made by the operator and take care of voltage fluctuations and the amount of moisture in the green material.

In connection with the degree of heat developed by the heater 121, provision may be made to insure against excessive temperatures, particularly when no charge is in the roasting cylinder as in initially warming the apparatus. For example, a thermostat 200 may be located in the vent connection 190 and designed, in manner well understood, to cut in or out one or more of the heating units, as the unit 201, of the heating grid.

The volume of the hopper 37 may conveniently be altered by hinging portions 205 and 206 of its respective side walls to the body of the hopper. The said portions are then attached to rods 207 and 208 slidably engaging nuts 209 and 210 reciprocable on oppositely threaded portions 211 and 212, respectively, of a spindle 213 which is mounted for rotation in a bearing 214 secured to the hopper body and extending through the wall of housing 20. A removable operating handle or knob 215 at the outer end of said spindle serves for rotating the spindle when adjusting the volume of said hopper.

I claim:

1. Roasting apparatus, comprising a chassis, a sealed stationary roasting cylinder fixed to said chassis, means located within the roasting cylinder for agitating raw material, a vent from said cylinder and means to relieve therethrough excess vapors from said cylinder, means to provide a heated atmosphere within the roasting cylinder to heat therein a charge of raw material, a cooling cylinder rotatably mounted on the chassis below said roasting cylinder and means to direct cooling air through said cooling cylinder, together with means to supply periodically a charge of raw material to the roasting cylinder and to deliver the charge when roasted to the cooling cylinder.

2. Roasting apparatus, comprising a chassis, a sealed stationary roasting cylinder fixed to said chassis, means located within the roasting cylinder for agitating raw material, a vent from said cylinder and means to relieve therethrough excess vapors from said cylinder, means to provide a heated atmosphere within the roasting cylinder to heat therein a charge of raw material, a cooling cylinder rotatably mounted on the chassis below said roasting cylinder, together with means to supply periodically a charge of raw material to the roasting cylinder and to deliver the charge when roasted to the cooling cylinder, and means to condense and cool said vapors, together with means to direct the same then through said cooling cylinder.

3. Roasting apparatus, comprising a chassis embodying an upright plate with an opening provided therein, a stationary roasting cylinder and a rotatable cooling cylinder mounted at one side of the plate, the former above the latter and having two openings, one of which is adapted to receive a charge through the opening in the plate and the other adapted for discharge of said charge to the cooling cylinder, means located within the roasting cylinder for agitating raw material, means to provide a heated atmosphere within the roasting cylinder to heat therein a charge of raw material, a measuring hopper for raw material located at the opposite side of said plate above the associated plate and roasting cylinder openings and having an outlet communicating with the former opening, means for interrupting free communication between the associated openings of the plate and roasting cylinder and for controlling the other opening of said roasting cylinder, together with mechanism carried by the plate at the measuring hopper side thereof for operating said interrupting means to afford communication alternatively through one or the other of the said roasting cylinder openings.

4. Roasting apparatus, comprising a chassis, a stationary roasting cylinder fixed to said chassis, means located within the roasting cylinder for agitating raw material, and a cooling cylinder carried by the chassis, means to provide a heated atmosphere within the roasting cylinder to heat therein a charge of raw material, a source of supply of the material to be roasted and a measuring hopper connected therewith having an outlet, and a valve member oscillatable about the longitudinal axis of said roasting cylinder and operatively associated with the hopper outlet and said roasting cylinder for delivering a charge from the hopper into the roaster and for delivering the charge when roasted into the cooling cylinder, together with timed means for actuating said valve.

5. Roasting apparatus, comprising a chassis embodying an upright plate with an opening provided therein, a roasting cylinder and a cooling cylinder mounted at one side of the plate, the former above the latter and having two openings, one of which is adapted to receive a charge through the opening in the plate and the other adapted for discharge of said charge to the cooling cylinder, means to provide a heated atmosphere within the roasting cylinder to heat therein a charge of raw material, a measuring hopper for raw material located at the opposite side of said plate above the associated plate and roasting cylinder openings and its outlet communicating with the former opening, a valve member located between the said plate and the roasting cylinder and movable over the opening in said plate and over the juxtaposed end of the cylinder, and timed means to oscillate the valve member to afford alternatively communication between the said plate opening and one of the openings of the roasting cylinder and to uncover the other opening thereof.

6. In roasting apparatus, the combination with a support, a chassis adapted to rest thereon, a roasting cylinder and a measuring hopper for raw material associated therewith and both carried by the chassis, means to provide a heated atmosphere within the roasting cylinder to heat therein a charge of raw material, a cooling cylinder carried by the chassis, together with mechanism for supplying a charge of material to be roasted from the hopper to said roasting cylinder and discharging the same therefrom into the cooling cylinder, together with means to deliver the cooled charge from said cooling cylinder; of a separable enclosing housing adapted to rest over the mechanism upon the support and provided at the top with a storage bin for raw material, the bottom of said bin having an opening juxtaposed to the top of said measuring hopper for discharge of raw material thereto, and intermediate means normally interrupting flow of material from the bin into the hopper, together with means controlled by said mechanism to operate said intermediate means for allowing material to discharge from said bin into the hopper.

7. In roasting apparatus, the combination with a support, a chassis adapted to rest thereon, a roasting cylinder and a measuring hopper for raw material associated therewith and both carried by the chassis, means to provide a heated atmosphere within the roasting cylinder to heat therein a charge of raw material, a cooling cylinder carried by the chassis, together with mechanism for supplying a charge of material to be roasted from the hopper to said roasting cylinder and discharging the same therefrom into the cooling cylinder, together with means to deliver the cooled charge from said cooling cylinder; of a separable enclosing housing adapted to rest over the mechanism upon the support, one wall of said housing being provided with an apron affording a chute overhanging an edge of the support, and a storage drawer for roasted material discharged from the cooling cylinder, said drawer being movably mounted with respect to the said support below the same and having a forwardly inclined mouthpiece juxtaposed to the bottom of said chute.

8. In roasting apparatus, the combination with a support, a chassis adapted to rest thereon, a roasting cylinder and a measuring hopper for raw material associated therewith and both carried by the chassis, means to provide a heated atmosphere within the roasting cylinder to heat therein a charge of raw material, a cooling cylinder carried by the chassis; together with mechanism for supplying a charge of material to be roasted from the hopper to said roasting cylinder and discharging the same therefrom into the cooling cylinder, together with means to deliver the cooled charge from said cooling cylinder; of a separable enclosing housing adapted to rest over the mechanism upon the support, one wall of said housing being provided with an apron affording a chute overhanging an edge of the support, a chaff drawer extending through said chute below the cooling cylinder and resting upon said support, and a storage drawer for roasted material discharged from the cooling cylinder, said drawer being movably mounted with respect to the said support below the same and having a forwardly inclined mouthpiece juxtaposed to the bottom of said chute.

9. Roasting apparatus, comprising a chassis, a stationary roasting cylinder and a measuring hopper for raw material associated therewith, means located within the roasting cylinder for agitating raw material, means to provide a heated atmosphere within the roasting cylinder to heat therein a charge of raw material, and a cooling cylinder rotatably carried by the chassis, together with mechanism for supplying a charge of material to be roasted from the hopper to said roasting cylinder and discharging the same therefrom into the cooling cylinder, means to discharge the roasted material from the cooling cylinder, and means to operate simultaneously the mechanism for supplying a charge of material to the hopper and the means for discharging roasted material from the cooling cylinder.

10. In roasting apparatus, comprising a roasting cylinder adapted to receive a charge of material to be roasted and to discharge the same therefrom, and means to provide a heated atmosphere within the cylinder to heat the charge; timing means for determining the period of roasting, said timing means determining also a reheating period for the cylinder when free of a charge of the material, and including a rotatable, timed cam element, a double-throw switch actuated thereby and a solenoid included in circuit therewith, together with clutch mechanism controlled by the solenoid for operation of the charging and discharging mechanism.

11. In roasting apparatus, comprising a roasting cylinder adapted to receive a charge of material to be roasted and to discharge the same therefrom, and means to provide a heated atmosphere within the cylinder to heat the charge: timing means for determining the period of roasting, said timing means determining also a reheating period for the cylinder when free of a charge of the material, and including a rotatable, timed cam element, a double-throw switch actuated thereby and a solenoid included in circuit therewith, together with clutch mechanism controlled by the solenoid, rotatable means driven through said clutch for operation of the charging and discharging mechanism, and a further and circuit-maintaining switch in circuit with one side of the first-named switch and controlled by the said rotatable means.

12. In roasting apparatus, comprising a roasting cylinder adapted to receive a charge of material to be roasted and to discharge the same therefrom, and means to provide a heated atmosphere within the cylinder to heat the charge: timing means for determining the period of roasting, said timing means determining also a reheating period for the cylinder when free of a charge of the material, and including a rotatable, timed cam element, a double-throw switch actuated thereby and a solenoid included in circuit therewith, together with clutch mechanism controlled by the solenoid, rotatable means driven through said clutch for operation of the charging and discharging mechanism, a further and circuit-maintaining switch in circuit with one side of the first-named switch and controlled by the said rotatable means, and a third switch in circuit with the other side of the first-named switch for interrupting the circuit to the solenoid and controlled by said rotatable means.

13. Roasting apparatus, comprising a chassis, a sealed stationary roasting cylinder fixed to the chassis, a vent from said cylinder and means to relieve therethrough excess vapors from said cylinder, a heating chamber connected with the roasting cylinder and including electrical heating units, a fan associated with the heating chamber to draw gases from the roasting cylinder and direct them over the heating unit and back into said cylinder, said relieving means incuding a condensing chamber for the vapors from said cylinder and connected with the cylinder by said vent, a duct extending from said chamber, together with a blower whose inlet is in juxtaposition to the outlet end of said duct.

14. Roasting apparatus, comprising a chassis, a sealed stationary roasting cylinder fixed to the chassis, a cooling cylinder rotatably mounted on the chassis, a vent from said cylinder and means to relieve therethrough excess vapors from said cylinder, a heating chamber connected with the roasting cylinder and including electrical heating units, a fan associated with the heating chamber to draw gases from the roasting cylinder and direct them over the heating unit and back into said cylinder, said relieving means including a condensing chamber for the vapors from said cylinder and connected with the cylinder by said vent, a duct extending from said chamber, together with a blower whose inlet is in juxtaposition to the outlet end of said duct, a cooling chamber communicating with the discharge from said blower, and the outlet of said cooling chamber being connected with the cooling cylinder.

15. Roasting apparatus, comprising a chassis, a sealed stationary roasting cylinder fixed to the chassis, a cooling cylinder rotatably mounted on the chassis, a vent from said roasting cylinder and means to relieve therethrough excess vapors from said cylinder, a heating chamber connected with the roasting cylinder and including electrical heating units, a fan associated with the heating chamber to draw gases from the roasting cylinder and direct them over the heating unit and back into said cylinder, a separable enclosing housing adapted to rest over said mechanisms, said relieving means including a condensing chamber for the vapors from said roasting cylinder and connected with the roasting cylinder by said vent, a duct extending from said chamber, together with a blower whose inlet is in juxtaposition to the outlet end of said duct, a cooling chamber communicating with the discharge from said blower, the outlet of said cooling chamber being connected with a casing surrounding the cooling cylinder and the said casing being provided with an outlet into the separable enclosing housing for the apparatus.

16. In roasting apparatus: the combination of a roasting cylinder having an inlet opening through which a charge of material to be roasted is received by said cylinder and an outlet opening for discharge of roasted material from said cylinder, together with valve means to control said openings, and means to provide a heated atmosphere within the cylinder to heat the charge; with a timer, a cam driven by the timer having two dwell portions, a multi-contact mercury switch actuated by the inclined portions connecting the dwell portions of the cam to cause the switch to assume two positions, and electrical means including a solenoid-actuated clutch controlled by the said switch in its different positions, together with rotatable means operative when the solenoid is energized and an element oscillated by the rotatable means for operating the valve means.

HAROLD J. KENNEDY.